Patented Aug. 1, 1933

1,920,564

UNITED STATES PATENT OFFICE 1,920,564

AGENT FOR SIZING TEXTILE FIBERS AND A PROCESS OF SIZING TEXTILE FIBERS

Kurt Jochum and Arthur Voss, Frankfort-on-the-Main, Hermann Geier, Mainz-Kastel, and Ewald Dickhäuser, Gersthofen near Augsburg, Germany, assignors to I. G. Farbenindustrie Aktiengesellschaft, Frankfort - on - the - Main, Germany No Drawing. Application November 24, 1931, Serial No. 577,158, and in Germany November 29, 1930

2 Claims. (Cl. 91—68)

The present invention relates to agents for sizing textile fibers and to a process of sizing textile fibers.

We have found that a sizing agent containing a polyvinyl alcohol of a very high degree of viscosity shows a surprisingly strong sizing effect. Polyvinyl alcohols of a high viscosity may be obtained for instance by saponification of polyvinyl esters which show a very high viscosity and are insoluble in solvents or at most capable of swelling therein. Such polyvinyl esters may for instance be prepared by polymerization of a vinyl ester in the presence of a perborate and acetic anhydride. Polyvinyl alcohols of high viscosity may likewise be prepared by adding a small amount of a boro compound to a polyvinyl alcohol of medium or low viscosity. By the addition of alkali the viscosity of the polyvinyl alcohols treated with a boro compound may considerably be increased. These polyvinyl alcohols of a high viscosity likewise yield with water solutions of very high viscosity. These solutions have a sizing effect which is considerably superior to that of the hitherto known polyvinyl alcohols. Solutions of 4 per cent strength of these polyvinyl alcohols of very high viscosity yield for instance in the viscosity test an outflow speed of about 300 to more than 600 seconds, whereas solutions of 4 per cent strength of hitherto known polyvinyl alcohols prepared for instance according to the process described in U. S. Patent No. 1,672,156 yield only an outflow speed of about 100–200 seconds. The outflow speed of water under the same conditions amounts to 25 seconds and that of a 4 per cent. aqueous solution of glycerine amounts to 27.5 seconds. For sizing such polyvinyl alcohols are especially used as shown in a 4 per cent. aqueous solution a viscosity increased about 10 to 25 times in comparison to a glycerine solution of the same concentration. If these polyvinyl alcohols are used in more concentrated solutions, the viscosity is increased in a still larger degree in comparison to the solutions of the same concentration of the known products. Whereas a comparatively large amount of the hitherto known polyvinyl alcohols was necessary to obtain a good sizing effect, the same effect can be obtained by applying only a small amount of the above mentioned highly viscous polyvinyl alcohols.

The following examples serve to illustrate our invention, but they are not intended to limit it thereto, the parts being by weight:

1. Vinyl ester is polymerized in the presence of acetic anhydride and sodium-perborate until the product is only capable of swelling in organic solvents. This ester is saponified until polyvinyl alcohol is formed and the saponification product is dissolved in water to a solution of about 1–1½ per cent. strength. Hanks of artificial silk are introduced into this solution, kept in motion therein for a short time, then centrifuged and dried. A well sized material is obtained which is distinguished by a soft feel.

2. In a similar manner a solution of polyvinyl alcohol of a very high viscosity and prepared as described in example 1 is used for the impregnation of cotton in the warp. In this case, too, there is obtained a sized material which can easily be further treated.

3. Polyvinyl alcohol, obtained by polymerizing vinyl acetate with the aid of 0.3 per cent. of acetyl peroxide to a polyvinyl acetate of a very high viscosity and then saponifying this ester in known manner, is dissolved in water to a solution of 1.5 per cent. strength. Acetate silk is introduced into this solution and then treated as described in Example 1.

There is obtained a sized material of a soft feel which can easily be further treated.

4. If a polyvinyl alcohol, obtained by polymerizing vinyl butyrate with the aid of 0.4 per cent. of butyryl peroxide and saponifying the polymeric product, is used instead of the polyvinyl alcohol described in Example 3, there is obtained a good sizing effect resembling that of Example 3.

5. A polyvinyl ester prepared by polymerizing the monomeric product in the presence of acetic acid anhydride and of sodium perborate until the product is only capable of swelling in the organic solvents, is saponified. The polyvinyl alcohol thus obtained is dissolved in water to a 12 per cent. solution and to this solution caustic soda solution is added until a weakly alkaline reaction is obtained. A considerable increase of the viscosity is thus obtained and simultaneously a greatly improved sizing effect. Instead of 100 g. per liter only 30–50 g. per liter of the product to which alkali has been added is required for obtaining a good and supple sizing effect.

6. Polyvinyl acetate polymerized to a relatively low degree is saponified until a polyvinyl alcohol is obtained which still contains one third of the acetyl groups and is soluble in alcohol and in water. 25 parts of the polyvinyl alcohol thus prepared are dissolved in 200 parts of water. There is obtained a relatively thin liquid solution which is used for sizing and yields a low sizing effect. If this solution is mixed with a solution of 0.5 part of borax and 5 parts of water, the viscosity of the solution is considerably increased. The sizing effect obtained with this solution which may be diluted, is considerably superior to that of the hitherto known polyvinyl alcohols.

7. 80 parts of a polyvinyl alcohol showing a rather low sizing effect and prepared by saponification of polyvinyl chloracetate are treated in a ball mill together with 1 part of borax and 2 parts of sodium carbonate. In order to attain a better solubility or to modify the sizing effect 2-3 per cent. of a dispersing agent or a water-soluble softening agent may be added. A sizing agent is obtained having a sizing effect which is considerably superior to that of the polyvinyl alcohol used without the addition of the boro compound.

We claim:

1. The process which comprises treating textile fibers with an agent containing a highly viscous polyvinyl alcohol which in an aqueous solution shows about 10 to 25 times the viscosity of an aqueous glycerine solution of equal concentration.

2. An agent for sizing textile fibers comprising a highly viscous polyvinyl alcohol which in an aqueous solution shows about 10 to 25 times the viscosity of an aqueous glycerine solution of equal concentration.

KURT JOCHUM.
ARTHUR VOSS.
HERMANN GEIER.
EWALD DICKHÄUSER.